(12) United States Patent
Cam Winget

(10) Patent No.: US 7,275,157 B2
(45) Date of Patent: Sep. 25, 2007

(54) FACILITATING 802.11 ROAMING BY PRE-ESTABLISHING SESSION KEYS

(75) Inventor: Nancy Cam Winget, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 731 days.

(21) Appl. No.: 10/729,171

(22) Filed: Dec. 5, 2003

(65) Prior Publication Data

US 2004/0240412 A1 Dec. 2, 2004

Related U.S. Application Data

(60) Provisional application No. 60/511,187, filed on Oct. 14, 2003, provisional application No. 60/473,507, filed on May 27, 2003.

(51) Int. Cl.
*H04Q 7/00* (2006.01)
(52) U.S. Cl. ...................................... 713/168; 380/272
(58) Field of Classification Search ................ 713/168, 713/169; 726/5; 380/272
See application file for complete search history.

(56) References Cited

U.S. PATENT DOCUMENTS

| | | | |
|---|---|---|---|
| 7,107,051 B1* | 9/2006 | Walker | 455/432.1 |
| 2003/0009660 A1* | 1/2003 | Walker | 713/153 |
| 2003/0093663 A1* | 5/2003 | Walker | 713/150 |
| 2004/0003238 A1* | 1/2004 | Mak et al. | 713/156 |
| 2004/0006705 A1* | 1/2004 | Walker | 713/200 |
| 2005/0032506 A1* | 2/2005 | Walker | 455/411 |

FOREIGN PATENT DOCUMENTS

WO    WO 200182037 A2 * 11/2001

OTHER PUBLICATIONS

International Search Report, Int'l Appl. No. PCT/US2004/016700 filed on May 27, 2004.
"EAP Key Management Framework" INTERNET, Aug. 2003, XP002287958.
Pack, S. and Yanghee, Choi, "Pre-Authenticated Fast Handoff in a Public Wireless LAN Based on IEEE 802.1X Model" INTERNET, 2002, XP002294124.
LAN MAN Standard Commitee, "P802.11i. Draft Supplement to Standard for Telecommunications and information Exhange Between Systems—LAN/MAN Specific Requirements—Part 11: Wireless Medium Access Control (MAC) and Physical Layer (PHY) Specifications: Specification for Enhanced Security", IEEE, 'Online? Nov. 2002, pp. 1-128, XP002304762.
McCann, P., "Mobile IPv6 Fast Handovers for 802.11 Networks" INTERNET, Oct. 2002, XP002288527.

(Continued)

*Primary Examiner*—Kim Vu
*Assistant Examiner*—Tom Gyorfi
(74) *Attorney, Agent, or Firm*—Tucker Ellis & West LLP

(57) ABSTRACT

A method and system for pre-authenticating a pre-establishing key management on a roaming device prior to reassociation to facilitate fast hand-off in a wireless network is described. For enhanced mobility, both authentication and key establishment is performed prior to reassociation of the roaming device between access points. When the roaming device enters in contact with one of the access points, a local authentication is performed between the access point and the roaming device prior to reassociation with the access point to allow for fast hand-offs of the device between access points within the network.

15 Claims, 4 Drawing Sheets

OTHER PUBLICATIONS

Young, Kim, "802.11b Wireless LAN Authentication, Encryption, and Security" INTERNET, May 31, 2001, XP002250118.

Dell White Paper, "Wireless Security in 802.11 (Wi-Fi) Networks", Jan. 2003, pp. 1-8, XP002294652.

* cited by examiner

FACILITATING 802.11 ROAMING BY PRE-ESTABLISHING SESSION KEYS This application claims priority of U.S. Provisional Application No. 60/511,187, filed Oct. 14, 2003 and U.S. Provisional Application No. 60/473,507 filed May 27, 2003.

BACKGROUND OF THE INVENTION

Wireless local area networks (wireless LANs, or WLANs) have changed the landscape of computer networking. The use of mobile computing devices, such as laptops and personal digital assistants, coupled with the demand for continual network connections without having to "plug in," are driving the adoption of enterprise WLANs.

A WLAN allows end users to access e-mail, schedule meetings, and access files and applications on the corporate or university network from conference rooms, classrooms, co-workers' desks, and virtually anywhere. With wireless networking, regardless of where they are in a facility, end users are just a mouse-click away from key information and applications.

With the increased reliance on WLANs, businesses are increasing more concerned about network security. With a WLAN, transmitted data is broadcast over the air using radio waves. This means that any wireless client within an access point (AP) service area can receive data transmitted to or from the access point. Because radio waves travel through ceilings, floors, and walls, transmitted data may reach unintended recipients on different floors or even outside the building that houses the AP. With a WLAN, the boundary for the network has moved. Without stringent security measures in place, installing a WLAN can be the equivalent of putting Ethernet ports everywhere, including the parking lot.

As with other networks, security for WLANs focuses on access control and privacy. Traditional WLAN security includes the use of Service Set Identifiers (SSIDs) using open or shared-key authentication, static Wired Equivalent Privacy (WEP) keys and optional Media Access Control (MAC) authentication. This combination offers a certain level of access control and privacy, but each element can be compromised.

The 802.11 standard is a group of specifications for WLANs created by the Institute of Electrical and Electronics Engineers Inc. (IEEE) and supports two means of client authentication: Open and Shared-Key authentication. Open authentication involves little more than supplying the correct SSID. With shared-key authentication, the AP sends the client device a challenge text packet that the client must then encrypt with the correct WEP key and return to the access point. If the client has the wrong key or no key, authentication will fail and the client will not be allowed to associate with the access point. Shared-key authentication is not considered secure, because a hacker who detects both the clear-text challenge and the same challenge encrypted with the WEP key can decipher the WEP key.

With open authentication, even if a client can complete authentication and associate with an AP, the use of WEP prevents the client from sending data to and receiving data from the AP, unless the client has the correct WEP key.

FIG. 1 illustrates the transactions involved in client authentication in the 802.11 specification. Initially, during the "discovery" phase, a mobile node (MN) client 10 broadcasts a probe request frame 20 on several channels. Access points 12 of the wired network 14 within range respond with a probe response frame 22. The client 10 then decides which access point 12 is best for access and sends an authentication request 24 initiating the "authentication" phase. The access point 12 sends an authentication reply 26. Upon successful authentication, the client 10 commences the "association" phase by sending an association request frame 28 to the access point 12. The access point then replies with an association response 30 and, thereafter, the client is then able to pass traffic to and receive traffic from the access point.

It has been recognized that vulnerabilities exist in the 802.11 authentication and data privacy schemes. To that end, the EEE has adopted 802.1X as a new standard for session authentication on wired and wireless networks. This standard can provide WLANs with strong, mutual authentication between a client and an authentication server. In addition, 802.1X can provide dynamic per-user, per-session keys that can be used to protect the data-link layer, removing a set of administrative burdens and security issues surrounding static WEP keys.

Several 802.1X authentication types exist, each providing a different approach to authentication while relying on the same framework and the Extensible Authentication Protocol (EAP) for communication between a client and an AP. Mutual authentication is implemented between the client and an authentication server (AS), for instance, a remote authentication dial-in user service (RADIUS) server. The credentials used for authentication, such as a log-on password, are never transmitted in the clear, or without encryption, over the wireless medium.

Generally, a supplicant station (STA) such as a mobile node (MN) discovers the AP's security policy through passively monitoring beacons or through active probing. If 802.1X authentication is used, however, the EAP authentication process starts when the AP sends an EAP-request 32 as shown in FIG. 2 or when the STA sends an EAPOL-start message 34. EAP authentication frames 36 pass between the supplicant and application server via the authenticator and supplicant's uncontrolled ports as shown in FIG. 2. The supplicant and authentication server authenticate each other (e.g., EAP-TLS) and generate a Pairwise Master Key (PMK). The PMK 38 is sent from the AS to the authenticator over the secure channel as shown in FIG. 2. Those skilled in the art recognize that the PMK is established by a successful authentication. This is the term used in both the IEEE 802.11 security focused task group 'i' (TGi) and WiFi's Wireless Protected Access (WPA) draft specification and is a key used to derive the Pariwise Transient Keys or PTKs used to protect the 802.11 data frames.

Lastly, as shown in FIG. 3, a 4-way handshake 40 utilizing 802.1X EAPOL-key messages is initiated by the authenticator to permit secured general data traffic. The 4-way handshake confirms the existence of the PMK and also confirms that the PMK is current. A Pairwise Transient Key (PTK) is derived from the PMK during the 4-way handshake. Also, unicast encryption and integrity keys are installed into the 802.11. A Group Transient Key (GTK) is transported from the authenticator from the supplicant and the GTK is installed in the STA, and in the AP if not already installed. Lastly, the ciphersuite selection is confirmed.

While current key management schemes provide security associations, they lack the required elements for optimizing the transition of a client as it moves from one access point to another. Realtime devices such as phones require the ability to seamlessly roam with little or no disruption to their security association. One solution has been proposed in an attempt to minimize handoff process delays and is shown in FIG. 4. As shown there, the so-called "IEEE 802.1X pre-authentication" protocol involves including a pre-authentication exchange 50 between the discovery phase 52 during handoff and the re-association exchange portion 54 of the overall re-authentication process 56. The intervening step is an attempt to minimize handoff latency. Through the 802.1X pre-authentication scheme, it is possible for stations to partially authenticate through development of the pairwise master key PMK prior to association.

However, handoff process delays still occur and those delays can, in some cases, compromise the roaming capability of certain devices such as phones which require voice data. More particularly, the discovery phase, either during active or passive scanning includes a determination to find a new AP due to signal strength loss or an inability to communicate with the current AP. Probe delays incurred when a client searches for a new AP may be prohibitive to facilitate roaming of voice-type devices. Additionally, delays occur during the re-authentication stage when the station re-authenticates and re-associates to the new AP. These potential delays include computational delays for each authentication packet and for each packet requiring the generation of a cryptographic value, such as a message integrity value. Additionally, media access delays exist due to packets sent by either other NICs between the authentication packets.

Overall, therefore, fast roaming capabilities for voice applications require full pre-authentication and key management such as the 4-way handshake to minimize handoff delays. It has been established that the re-association 4-way handshake to generate the PTK is too expensive timewise and cannot be delayed until after the re-association exchange. An additional 2-way handshake after the re-association exchange for GTK delivery also does not help in minimizing roaming latency.

There is, therefore, a need for methods, systems, apparatus, and computer readable medium which provide for seamless roaming of real time devices such as phones with little or no disruption to service because of security association delays.

The method, apparatus, system, and computer readable medium described in this application solve the above problems and others.

SUMMARY OF THE INVENTION

In accordance with an aspect of the present invention, a method, system, and article of manufacture are provided for reducing handoff latency of a mobile node MN roaming between access points APs in a wireless network WLAN. The mobile node MN is authenticated with the access point AP to produce a pairwise master key PMK. A pairwise transient key PTK is established as a link layer session key to provide secure communication of 802.1X messages and 802.11 data between the mobile node MN and the access point AP. Thereafter, the mobile node MN is re-associated with a first access point AP in said wireless network WLAN.

In accordance with another aspect, the authenticating and establishing steps are initiated before said re-associating. Preferably, the pairwise transient key PTK is negotiated or established between the mobile node and the access point before the re-associating step is initiated.

Further, the re-associating includes issuing a re-association request by said mobile node MN to the access point AP including signature information indicative of the mobile node MN holding a fresh/live pairwise transient key PTK. The signature information is validated by the access point AP and a group transient key GTK is delivered from the access point to the mobile node MN. The group transient key is used to protect communication between the mobile node MN, the access point AP, and the wireless network WLAN.

In accordance with yet another aspect of the invention, a re-association confirmation message is forwarded from the mobile node MN to the access point AP to confirm receipt of the group transient key GTK by the mobile node MN.

In a more limited aspect, the issuing of the re-association request by the mobile node MN includes issuing a resuscitation request as Authenticate PTK (SRandom PTKID, MIC). Also, the validating and delivering steps include delivering a re-association response from the access point AP to the mobile node MN as Authenticate PTK (ARandom, SRandom PTKID, GTKID, GTK, MIC), deliver group key. Further, the forwarding of the re-association confirmation message includes forwarding a re-association confirm from the mobile node MN to the access point AP as Group Key Confirm (ARandom, MIC).

Preferably, an 802.11 4-way handshake is used to generate the pairwise transient key PTK using the pairwise master key PMK. Also, the authentication exchange includes producing the pairwise master key PMK by either retrieving the pairwise master key PMK from a cache memory of the access point AP, or by executing an 802.1X extensible authenticated protocol EAP by the access point AP together with an authentication server AS of the wireless network WLAN to generate the pairwise master key PMK.

While prior key management schemes provide security associations, they lack the requirement elements for optimizing the transition of a client as it moves from one access point to another. The present invention, however, optimizes the transition of a client as it moves from one access point to another while providing the necessary security associations for secure wireless communication.

Many other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
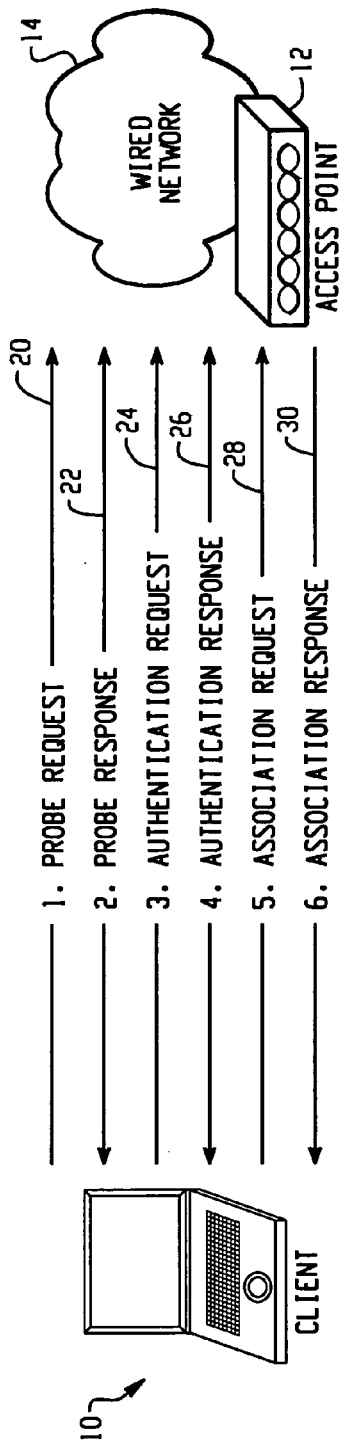
FIG. 1 is a schematic representation of the data exchange between the roaming device client and an access point in a wired network according to the prior art.
Figure 2:
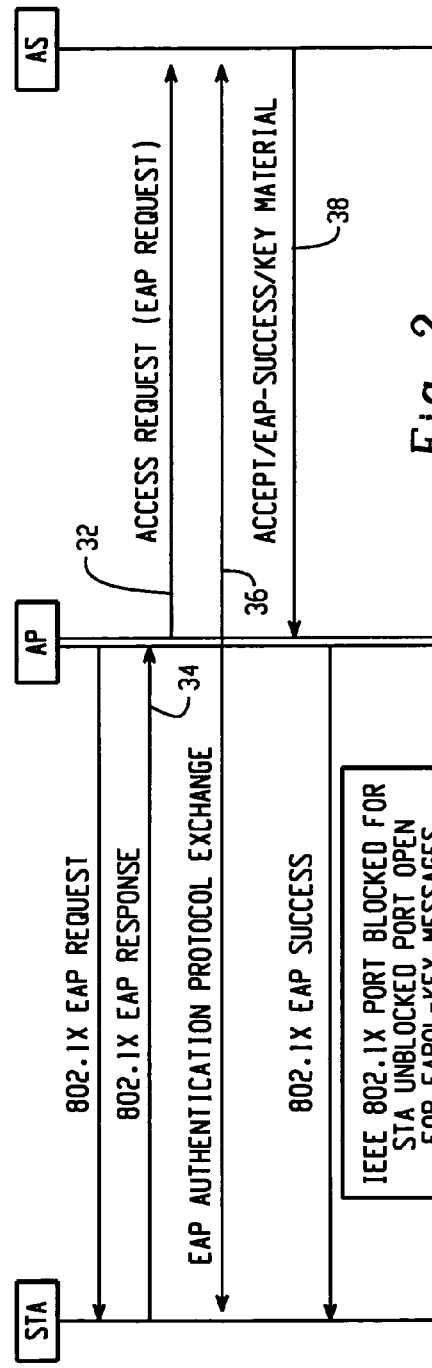
FIG. 2 is a schematic representation of the data exchange between a roaming device and an access point using 802.1X protocol.
Figure 3:
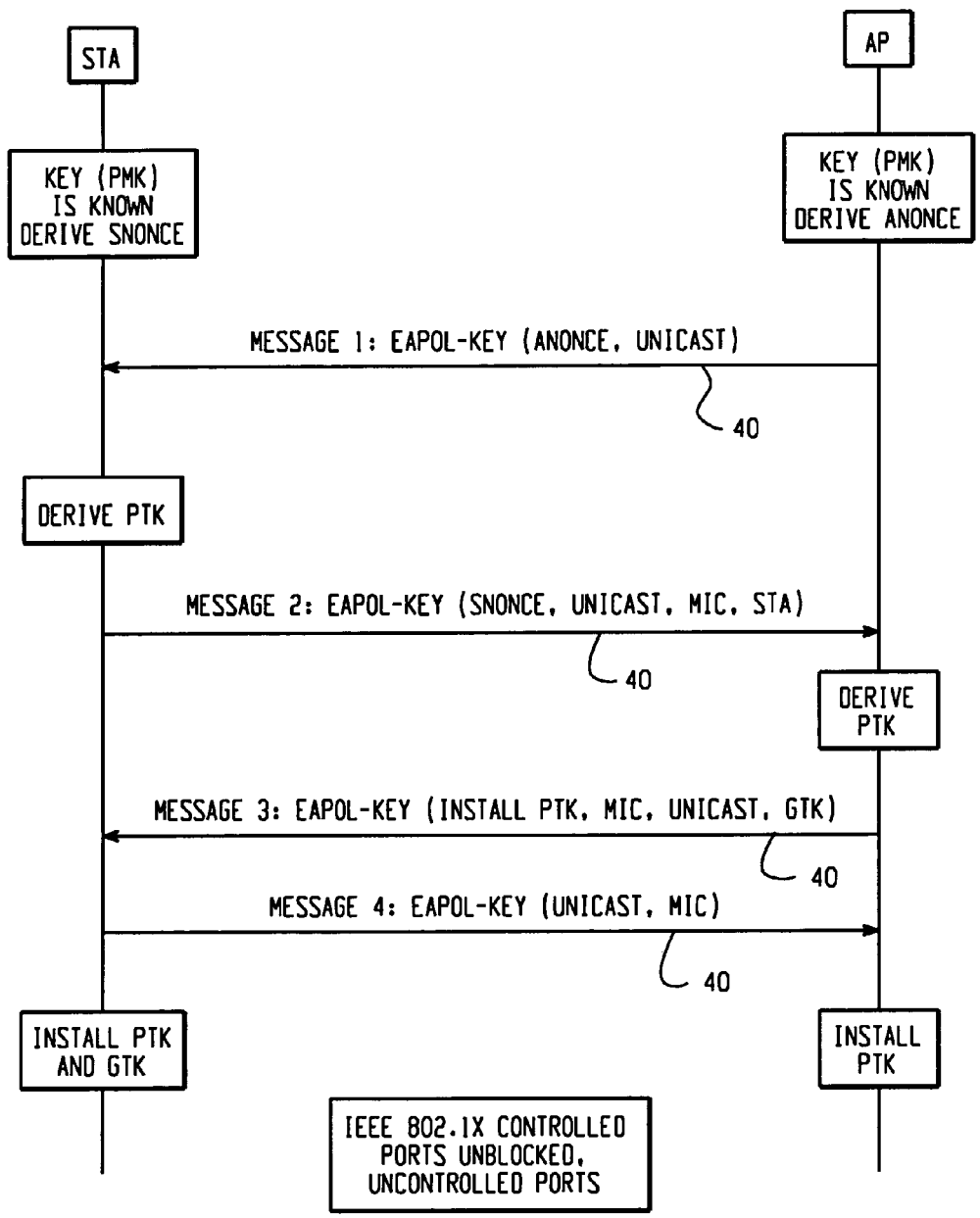
FIG. 3 is a schematic representation of the data exchange between a roaming device and an access point using 802.1X EAP authentication and with an additional 4-way handshake to derive a unique pairwise transient key.
Figure 4:
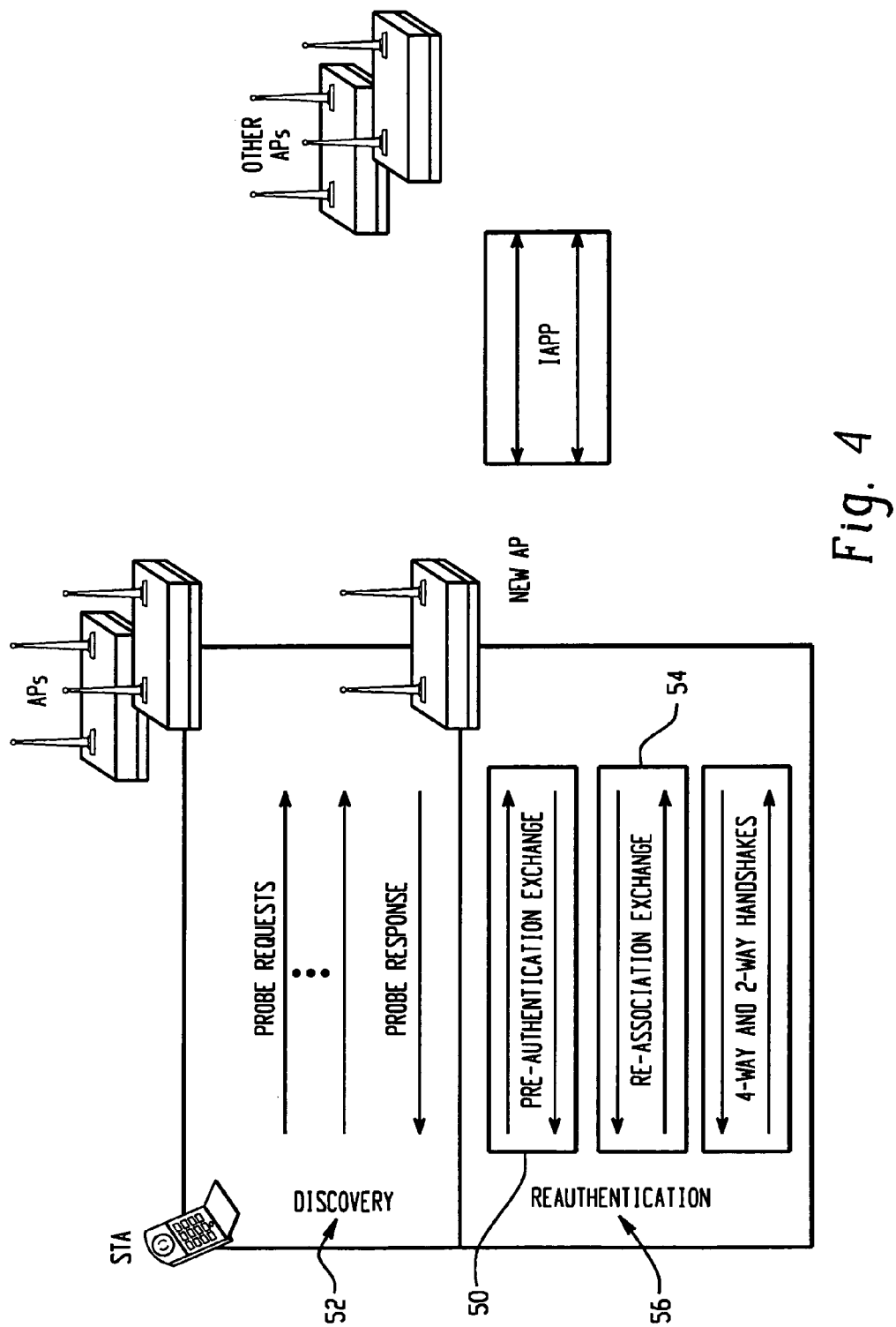
FIG. 4 is a schematic diagram and representation of the data exchange between a roaming device and an access point according to the prior art using 802.1X pre-authentication protocol.
Figure 5:
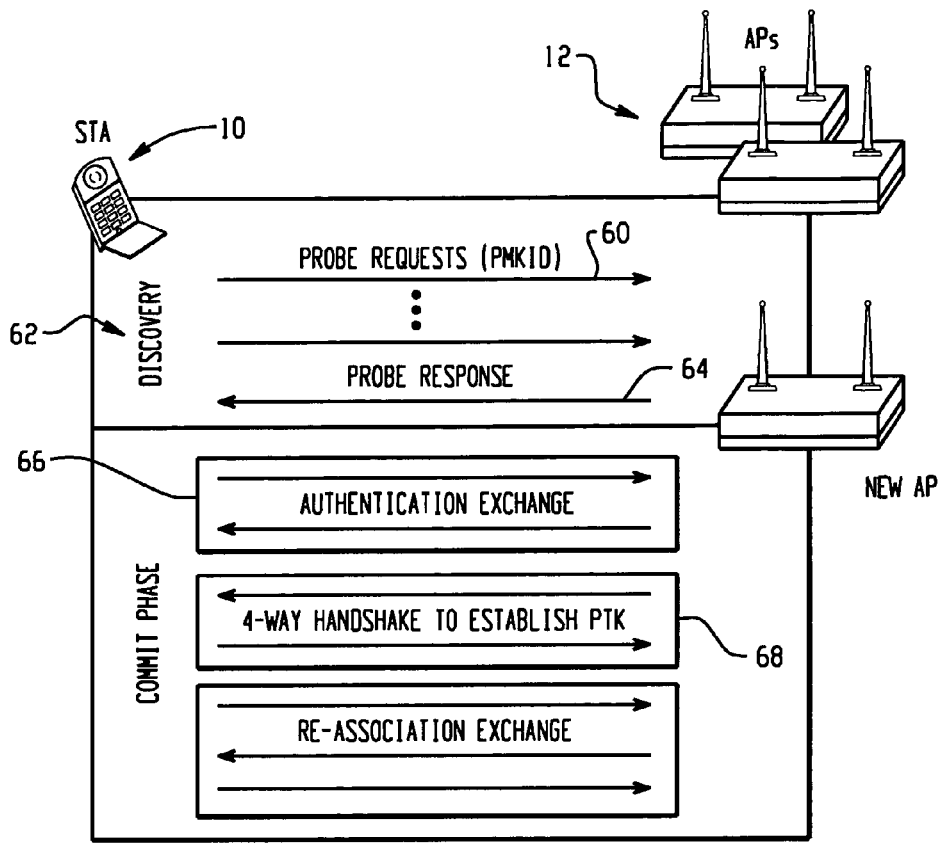
FIG. 5 is a schematic diagram and a schematic representation of the data exchange between a roaming device and an access point, according to an embodiment of the present invention; and, FIG. 6 is a schematic representation of handshaking between a roaming device and an access point according to the embodiment of the present invention shown in FIG. 5.
Figure 6:
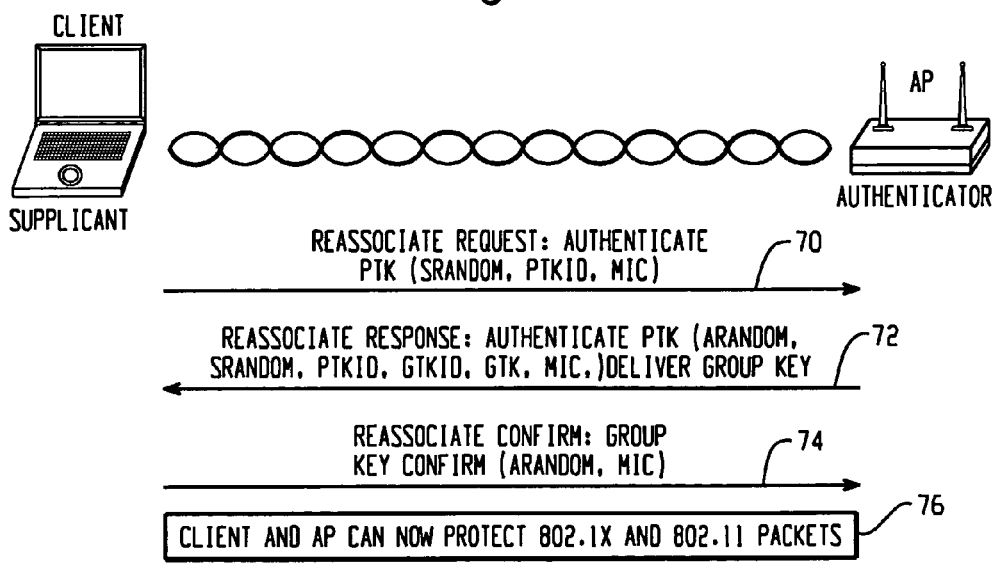

Referring now to the drawings wherein the showings are for the purposes of illustrating the preferred embodiment of the invention only and not for purposes of limiting same, FIGS. 5 and 6 show in schematic form a method, system, and article of manufacture for optimizing fast roaming in a wireless network through pre-authentication and early establishment of PTK, a reduction in cryptographic computations at re-association phase, wherein no propagation of MK or PMK is required.

As shown best in FIG. 5, the probe requests 60 during the discovery phase 62 include PHKID to allow the AP 12 to pre-fetch the key. Although this may add some minor latency in the Probe Response 64, the AP must get key before responding.

In accordance with the preferred embodiment of the invention, a new 802.11 authentication type, to be described below, is defined to initialize security association and establish PMK during the authentication exchange phase 66.

A 4-way handshake or any other suitable protocol is used in step 68 to establish a fresh PTK, using random nonces. In accordance with the preferred embodiment, counters are not used but rather strong random values are used to ensure the PTK freshness.

Thereafter, authentication elements are embedded in the re-association exchange 70 to prove the liveness of the PTK a new element is also introduced to deliver the group key, GTK in a protected field. A new 802.11 message to be described below is defined to confirm the group key delivery. It is to be appreciated that the third message is only needed if the group key is delivered in the second message.

With continued reference to FIGS. 5 and 6, four (4) management frames are defined prior to a re-association to allow for the establishment of a link layer session key. The establishment of the link layer session key relies on either a previously established (cached) master key established at initial authentication or through proactive key distribution by a roam server or authentication server. The 4 management frames are preferably semantically similar to the management frames of the Wi-Fi Protected access or TGi 4-way handshake. The 4 management frames are used to prove liveness of the master key as well as exchange nonces to derive a fresh link layer session key. In the management frames, negotiation of the ciphersuite is also achieved. In addition, these management frames convey the required information required to identify the session and ciphersuite these keys will affect.

These 4-management frames may be instantiated as special authentication messages or as other 802.11 management frames. These frames are exchanged prior to a client re-association request. This facilitates the establishment of the link layer session keys well before a client re-associates to the AP as best illustrated in FIG. 5.

The ability to pre-generate the link layer session key allows the re-association process to be shortened to the standard 1999 802.11 specification process and the additional liveness proof of the link layer session keys, PTK. The liveness proof of these keys can be achieved by defining information elements in the re-association exchange. Further, group keys for multicast communication may also be securely distributed in these information elements to further minimize the number of exchanges required to establish a security association.

Essentially, a means of pre-establishing link layer session keys prior to re-association is provided to minimize the re-association process time and improve handoff latency performance to support VoIP. One significant advantage of the preferred embodiment illustrated is that the WPA system is permitted to remain functional, while yet facilitating fast roaming.

As shown best in FIG. 6, the handoff procedure is essentially distilled into three exchanges: a re-association request 70, a re-association response 72, and a re-associate confirm 74. The Re-associate Request is of the form: authenticate PTK (SRandom, PTKID, MIC). The Reassociate Response is preferably of the form: authenticate PTK (ARandom, SRandom, PTKID, GTKID, GTK, MIC), deliver group key. The group key is delivered by inclusion of the key name, GTKID and the encrypted key, GTK. The encryption can be achieved using standard encryption techniques such as with AES to protect the GTK. The PTK is used as the AES encryption key. Furthermore, the MIC is a one-way hash encryption such as HMAC-SHAI used to protect the entire message by means of a message integrity value (e.g. MIC). Lastly, the Reassociate Confirm is preferably of the form: group key confirm (ARandom, MIC). Thereafter, the client or mobile node 10 and AP 12 can now protect 802.1X and 802.11 packets 76. Each receiving made must validate the MIC before responding. The reassociation fails if the message integrity (MIC) value is invalid.

Those skilled in the art will appreciate that compression is achieved by pre-authentication and pre-establishment of the unicast session key, PTK. Also, the mobile station's STA contact with the authentication server (AS) can be obviated if PMK is previously distributed by the AS. Further, the STA's contact with AS can be obviated by naming a PMK and allowing probe response/request to indicate PMK request using identifier (PMKID).

Those skilled in the art will further appreciate that the security association is initialized prior to re-association. The initialization may involve full STA authentication with AS or a minimized initialization as stated above. Further, PTK establishment may be achieved as defined by IEEE TGi using the nonce exchange PTK derivation function or may be achieved through other suitable means, but is preferably achieved prior to STA re-associating to a new AP.

In addition to the above the security association type is negotiated at authentication, based on the new authentication type described or through equivalents thereof. The preferred new authentication type described includes a capabilities fields whereby cipher suite capabilities are confirmed at key establishment.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A method of reducing handoff latency of a mobile node (MN) roaming between access points in a wireless network (WLAN), the method comprising:

authenticating the mobile node (MN) with an access point (AP) to produce a pairwise master key (PMK);

establishing a pairwise transient key (PTK) as a link layer session key to provide secure communication of 802.1X messages and 802.11 data between the mobile node and the access point;

associating the mobile node with the access point disposed on said wireless network, wherein said associating includes issuing an association request by said mobile node to the access point including signature information indicative of the mobile node holding a fresh/live pairwise transient key;

validating the signature information by the access point;

delivering a protected group transient key (GTK) from the access point to the mobile node, the group transient key being used to protect broadcast communication of the access point comprising generating an association response to send to the MN containing an encrypted field protecting the GTK and including signature information indicative of the AP holding the same fresh/live key PTK as the MN;

validating the signature information by the MN and storing the encrypted GTK for use in multicast communications by the AP; and forwarding a re-association confirmation message from the mobile node MN to the access point AP to confirm receipt of the group transient key GTK by the mobile node MN;

wherein said establishing establishes said pairwise transient key PTK before said associating is initiated;

wherein said issuing the re-association request by the mobile node MN includes issuing a resuscitation request as Authenticate PTK (SRandom, PTKID MIC);

wherein said validating and said delivering includes delivering a re-association response from the access point AP to the mobile node MN as Authenticate PTK (ARandom, SRandom, PTKID, GTK, GTKID, MIC), deliver encrypted group key; and, wherein said forwarding the re-association confirmation message includes forwarding a re-association confirm from the mobile node MN to the access point AP as Group Key Confirm (ARandom, MIC).

2. The method according to claim 1 wherein said authenticating and said establishing are initiated before said re-associating.

3. The method according to claim 1 wherein said establishing includes performing an 802.11 4-way handshake to generate said pairwise transient key PMK using said pairwise master key PMK.

4. The method according to claim 1 wherein the authenticating includes:
producing said pairwise master key PMK by at least one of:
retrieving said pairwise master key PMK from a cache memory of said access point AP, and
executing an 802.1X extensible authenticated protocol EAP by the access point AP together with an authentication server AS of said wireless network WLAN to generate said pairwise master key PMK.

5. The method according to claim 1 wherein said authenticating includes negotiating a security association type.

6. In a wireless network (WLAN) including at least one mobile node (MN) roaming between access points of the wireless network, a system for reducing handoff latency, the system comprising:
means for authenticating the mobile node with an access point (AP) to produce a pairwise master key (PMK);
means for establishing a pairwise transient key (PTK) as a link layer session key to provide secure communication of 802.1X compatible messages and 802.11 compatible data between the mobile node and the access point;
means for associating the mobile node with the access point in said wireless network;
means for validating the signature information by the access point; and, means for delivering a protected group transient key (GTK) from the access point to the mobile node, the group transient key being used to protect broadcast traffic from the access point, the means for delivering comprises means for generating an association response to send to the MN containing an encrypted field protecting the GTK and including signature information indicative of the AP holding the same fresh/live key PTK as the MN;

means for validating the signature information by the MN and storing the encrypted GTK for use in multicast communications by the AP; and means for forwarding a re-association confirmation message from the mobile node to the access point to confirm receipt of the group transient key by the mobile node;

wherein said means for establishing is adapted to establish said pairwise transient key PTK before said associating means is initiated;

wherein said re-associating means includes means for issuing a re-association request by said mobile node MN to the access point AP including signature information indicative of the mobile node MN holding a fresh/live pairwise transient key PTK;

wherein said means for issuing the re-association request by the mobile node includes means for issuing a resuscitation request as Authenticate PTK (SRandom, PTKID MIC);

wherein said means for validating and said delivering includes means for delivering a re-association response from the access point to the mobile node as Authenticate PTK (ARandom, SRandom, PTKID, GTKID, GTK, MIC), deliver encrypted group key; and wherein said means for forwarding the re-association confirmation message includes means for forwarding a re-association confirm from the mobile node to the access point as Group Key Confirm (ARandom, MIC).

7. The system according to claim 6 wherein said means for authenticating and said means for establishing are initiated before said means for re-associating.

8. The system according to claim 6 wherein said means for establishing includes means for performing an 802.11 4-way handshake to generate said pairwise transient key PMK using said pairwise master key PMK.

9. The system according to claim 6 wherein the means for authenticating includes:
means for producing said pairwise master key PMK by at least one of:
retrieving said pairwise master key PMK from a cache memory of said access point AP, and
executing an 802.1X extensible authenticated protocol EAP by the access point AP together with an authentication server AS of said wireless network WLAN to generate said pairwise master key PMK.

10. The system according to claim 6 wherein said means for authenticating includes means for negotiating a security association type.

11. An article of manufacture comprising a program storage medium readable by a computer and embodying one or more instructions executable by the computer to perform method steps for executing a command to perform method of reducing handoff latency of a mobile node (MN) roaming between access points in a wireless network (WLAN), the method comprising:
authenticating the mobile node with an access point (AP) to produce a pairwise master key (PMK);

establishing a pairwise transient key (PTK) as a link layer session key to provide secure communication of 802.1X compatible messages and 802.11 compatible data between the mobile node and the access point;

associating the mobile node with the access point in said wireless network;

validating the signature information by the access point AP; and, delivering a protected group transient key (GTK) from the access point to the mobile node, the group transient key being used to protect communication between the mobile node and the access point, the delivering a protected GTK comprises generating an association response to send to the MN containing an encrypted field protecting the GTK and including signature information indicative of the AP holding the same fresh/live key PTK as the MN;

validating the signature information by the MN and storing the encrypted GTK for use in multicast communications by the AP; and forwarding a re-association confirmation message from the mobile node to the access point to confirm receipt of the group transient key GTK by the mobile node;

wherein said establishing establishes said pairwise transient key PTK before said associating is initiated;

wherein said re-associating includes issuing a re-association request by said mobile node MN to the access point AP including signature information indicative of the mobile node MN holding a fresh/live pairwise transient key PTK wherein said issuing the re-association request by the mobile node includes issuing a resuscitation request as Authenticate PTK (SRandom, PTKID, MIC);

wherein said validating and said delivering includes delivering a re-association response from the access point to the mobile node as Authenticate PTK (ARandom, SRandom, PTKID, GTKID, GTK, MIC), deliver encrypted group key; and wherein said forwarding the re-association confirmation message includes forwarding a re-association confirm from the mobile node to the access point as Group Key Confirm (ARandom, MIC).

12. The article of manufacture according to claim 11 wherein said authenticating and said establishing are initiated before said re-associating.

13. The article of manufacture according to claim 11 wherein said establishing includes performing an 802.11 compatible 4-way handshake to generate said pairwise transient key using said pairwise master key.

14. The article of manufacture according to claim 11 wherein the authenticating includes:

producing said pairwise master key by at least one of:

retrieving said pairwise master key from a cache memory of said access point, and executing an 802.1X compatible extensible authenticated protocol EAP by the access point together with an authentication server (AS) of said wireless network to generate said pairwise master key.

15. The article of manufacture according to claim 11 wherein said authenticating includes negotiating a security association type.

* * * * *